(12) United States Patent
Chen et al.

(10) Patent No.: US 7,688,487 B2
(45) Date of Patent: *Mar. 30, 2010

(54) CIRCUIT SCANNER TO PERFORM COLOR SPACE CONVERSION ON RGB SIGNAL

(76) Inventors: Chun-Jen Chen, No. 14, 123 Lane, Hsinyii St., Wuchi Chen, Taichung Hsien (TW); Shih-Huang Chen, No. 12, Lane 206, Hsin-Chuang St., Hsinchu (TW)

( * ) Notice: Subject to any disclaimer, the term of this patent is extended or adjusted under 35 U.S.C. 154(b) by 564 days.

This patent is subject to a terminal disclaimer.

(21) Appl. No.: 11/498,416

(22) Filed: Aug. 2, 2006

(65) Prior Publication Data

US 2006/0268302 A1    Nov. 30, 2006

Related U.S. Application Data

(63) Continuation of application No. 10/034,860, filed on Dec. 27, 2001.

(30) Foreign Application Priority Data

Aug. 10, 2001    (TW) .............................. 90119598 A (51) Int. Cl.
*H04N 1/04*    (2006.01)

(52) U.S. Cl. ...................... 358/505; 358/515; 358/530; 358/500

(58) Field of Classification Search ................. 358/505, 358/515, 530, 500, 518, 506, 516, 474
See application file for complete search history.

(56) References Cited

U.S. PATENT DOCUMENTS 6,052,147 A    4/2000    Cheng
6,078,686 A *  6/2000    Kim ........................... 382/167

* cited by examiner

*Primary Examiner*—Houshang Safaipour
(74) *Attorney, Agent, or Firm*—Stolowitz Ford Cowger LLP (57) ABSTRACT

A circuit of a scanner to perform a color space conversion on an RGB signal. The circuit has several sampling-amplified-offset devices to sample, amplify and compensate potential of an R charge signal, a G charge signal and a B charge signal to obtain an R analog signal, a G analog signal and a B analog signal. The circuit further has a gain adder to multiply the corresponding weighted gain with the R analog signal, the G analog signal and the B analog signal. The multiplication results are then summed up to obtain an addition analog signal. A multiplexer is also included to select between the R analog signal, the G analog signal, the B analog signal and the addition analog signal for output.

20 Claims, 5 Drawing Sheets

CIRCUIT SCANNER TO PERFORM COLOR SPACE CONVERSION ON RGB SIGNAL

CROSS-REFERENCE TO RELATED APPLICATIONS

The present application is a continuation of U.S. application Ser. No. 10/034,860, filed Dec. 27, 2001, which claims the benefit of foreign priority under 35 USC §119(a) to Taiwan, R.O.C Application Serial No. 90119598, filed Aug. 10, 2001.

BACKGROUND OF THE INVENTION

1. Field of the Invention

The invention relates in general to a RGB signal processor of a scanner, and more particularly, to a circuit of a scanner to perform color space conversion on an RGB signal.

2. Description of the Related Art

Figure 1:
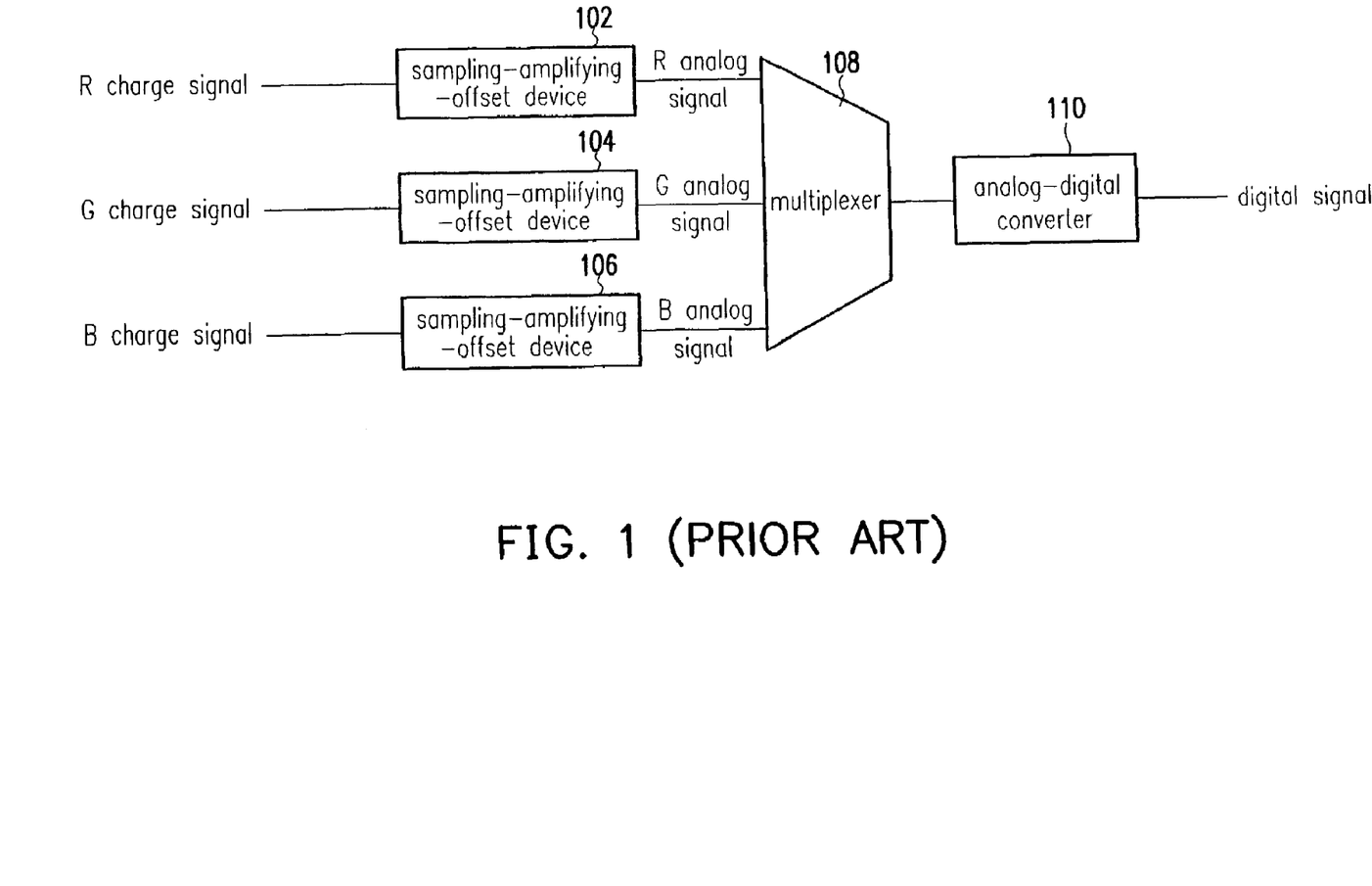
FIG. 1 shows a part of signal processing circuit of a conventional scanner.

The sensor used in the conventional color scanner includes a color charge coupled device (CCD) or a contact image sensor (CIS). The color charge coupled device is composed of several sensor cells to detect the light intensity of the three primary color lights, red light, green light and blue light. According to the detected result, an R charge signal, a B charge signal and a G charge signal are output. A signal process is required for the R, B and G charge signal to become the input signals for the subsequent circuit. FIG. 1 shows a part of the circuit for the signal process of a conventional scanner. The R charge signal, the G charge signal and the B charge signal are sent to the sampling-amplified-offset devices 102, 104 and 106. After sampling, amplifying and level compensations for the R charge signal, the G charge signal and the B charge signal by the sampling-amplified-offset devices 102, 104 and 106, R, G and B analog signals are generated. The multiplexer 108 sends the R, G and B analog signals to the analog-digital (A/D) converter 110. The analog-digital converter 110 then converts the R, G and B analog signals to digital signals and output them to the subsequent circuit.

When the color scanned result is output in gray scale, any one of the R, G and B analog signals is selected as the gray scale analog signal output. As shown in FIG. 1, when the multiplexer 108 selects the R analog signal as the gray scale analog signal output to the analog-digital converter 110, the G and B analog signals are not output to the analog-digital converter 110 via the multiplexer 108.

The above method uses the brightness of the R analog signal to determine the level of gray scale. When the brightness of the R analog signal at one pixel increases, the color of the pixel approaches white. In contrast, the color of the pixel approaches black when the brightness decreases. However, when the brightness of the R analog signal for the pixel is low, this means that the brightness of the G and B analog signals for the pixel is too low. If the brightness of either the G or B analog signal is high, the gray scale level of the displayed color for the pixel is incorrect.

In the RGB color model, the image is composed of three independent images. Each primary color corresponds a plane. When the three image planes are transmitted to the RGB display, a frame of a color image is obtained by combining these three image planes. Therefore, when the image itself is represented by three color planes, it is meaningful to apply the RGB model for the image process. On the other hand, RGB model is applied to most of the color camcorders used to obtain digital images. Therefore, it is a very important model for image process.

Another important model is the yuv model. The advantage for adapting the yuv model is that the brightness y can be separated from the correlated u and v. Further, the RGB color model can be converted into other models such as the theoretical three primary colors stimulated values X, Y and Z, the Adams chrominance-brightness space, and the CYM (cyan magenta yellow) color model. The yuv model using the RGB color model conversion is introduced as an example here.

When using the RGB color model in the yuv color model, the R, G and B analog signals are converted into individual digital signals. A software (such as a conversion program) is used to convert the digital signals into parameters of the yuv color space. The drawback of using the software to convert the RGB color model signal and the yuv color model is extremely high time consumption.

SUMMARY OF THE INVENTION

The invention provides a circuit for color space conversion of a RGB signal for a scanner. The circuit can be applied for a gray scale scan to reflect exactly the response of each pixel towards the gray scale. When applied to the conversion of RGB color model in different color models, a hardware is implemented to execute the conversion such that the conversion time of the color model signal into different color models is reduced.

The invention provides a circuit for color space conversion of RGB signals of a scanner. The circuit includes several sampling-amplified-offset devices to obtain an R analog signal, a G analog signal and a B signal by sampling, amplifying and level compensating a R charge signal, a G charge signal and a B charge signal, respectively. The circuit further includes a gain adder to multiply the R analog signal, the G analog signal and the B analog signal by a weighted gain. The multiplication results are then added together to result in an addition analog signal. A multiplexer is also included in the circuit to select the R analog signal, the G analog signal, the B analog signal or the addition analog signal as output. The gain adder includes several gain amplifiers and an adder. The gain amplifiers obtain several weighted analog signals by multiplying the R analog signal, the G analog signal and the B analog signal by the corresponding-weighted gains. The adder performs an addition operation on the weighted analog signals to obtain the addition analog signal. Thus, the gray scale response of the scanner can be reflected exactly. The conversion of the RGB color model signal into different color models can be executed by hardware.

Both the foregoing general description and the following detailed description are exemplary and explanatory only and are not restrictive of the invention, as claimed.

DESCRIPTION OF THE PREFERRED EMBODIMENTS

Figure 2A:
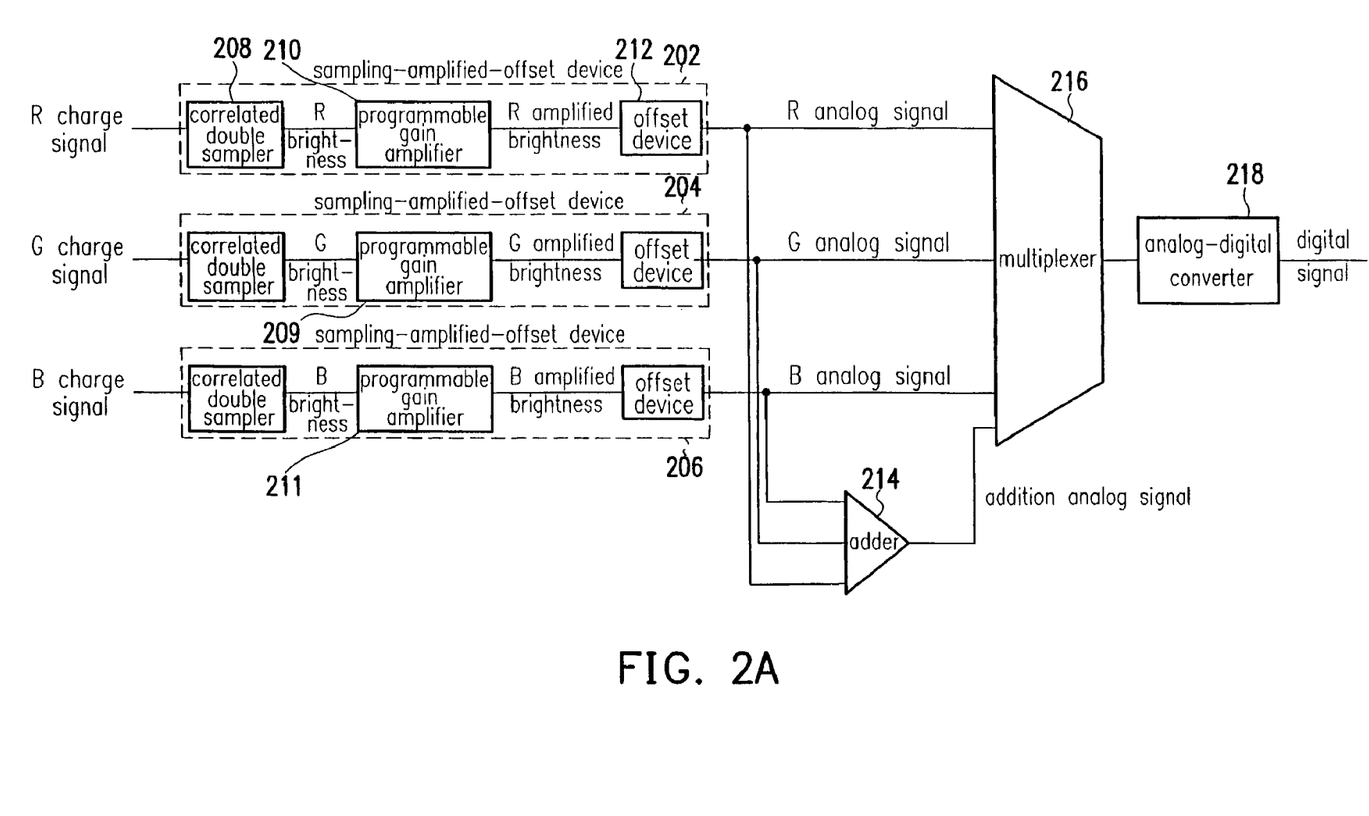
FIGS. 2A and 2B shows the signal processing circuit of a scanner converting the RGB into gray scale and yuv color model in one embodiment of the invention.

FIG. 2A shows an embodiment of a signal processing circuit of a scanner that converts RGB into the gray scale and the yuv color model. In FIG. 2A, the R charge signal, G charge signal and R charge signal detected by a sensor cell (not shown) are sent to sampling-amplified-offset devices 202, 204, 206. The sampling-amplified-offset devices 202, 204, 206 sample, amplify and compensate potential levels of the R, G and B charge signals to obtain an R analog signal, a G analog signal and a B analog signal.

The adder 214 performs an addition operation on the R analog signal, the G analog signal and the B analog signal to obtain an addition analog signal. The multiplexer 216 selects the R analog signal, the G analog signal, the B analog signal or the addition analog signal for output to the analog-digital converter 218. The output analog signal is then converted into a digital signal by the analog-digital converter 218.

In FIG. 2A, the sampling-amplified-offset devices 202, 204, 206 further comprise several devices. For example, the sampling-amplified-offset device 202 has a correlated double sampler 208, a programmable gain amplifier 210 and an offset device 212. The correlated double sampler 208 performs two times of sampling on the R charge signal and performs a subtraction operation on the sampling results to obtain an R brightness. The programmable gain amplifier 210 adjusts a gain value (the adjusting range is determined to the bit length for storing the gain value). The R brightness output from the correlated double sampler 208 is amplified to obtain an R-amplified brightness. The offset device 212 compensates the level of the R-amplified brightness to obtain the R analog signal. Similarly, the sampling-amplified-offset devices 204, 206 are similar to the sampling-amplified-offset device 202.

The conversion relation between the RGB color model and the yuv color model can be represented by the following matrix.

$$\begin{bmatrix} u \\ v \end{bmatrix} = \begin{vmatrix} 0.596 & -0.275 & -0.321 \\ 0.212 & -0.523 & 0.311 \end{vmatrix} \begin{vmatrix} G \\ B \end{vmatrix}$$

In the above equation, y represents the luminance, u represents the hue, and v represents saturation. If only the brightness of the yuv color model is used, the circuit as shown in FIG. 2A can complete the requirement. According to the above matrix, the relation between the brightness y and the RGB signal is:

$y=0.299R+0.587G+0.114B$

Therefore, the adjustable gain values of the programmable gain amplifier 210, 209 and 211 in FIG. 2A are 0.299, 0.587 and 0.114, respectively.

Figure 2B:
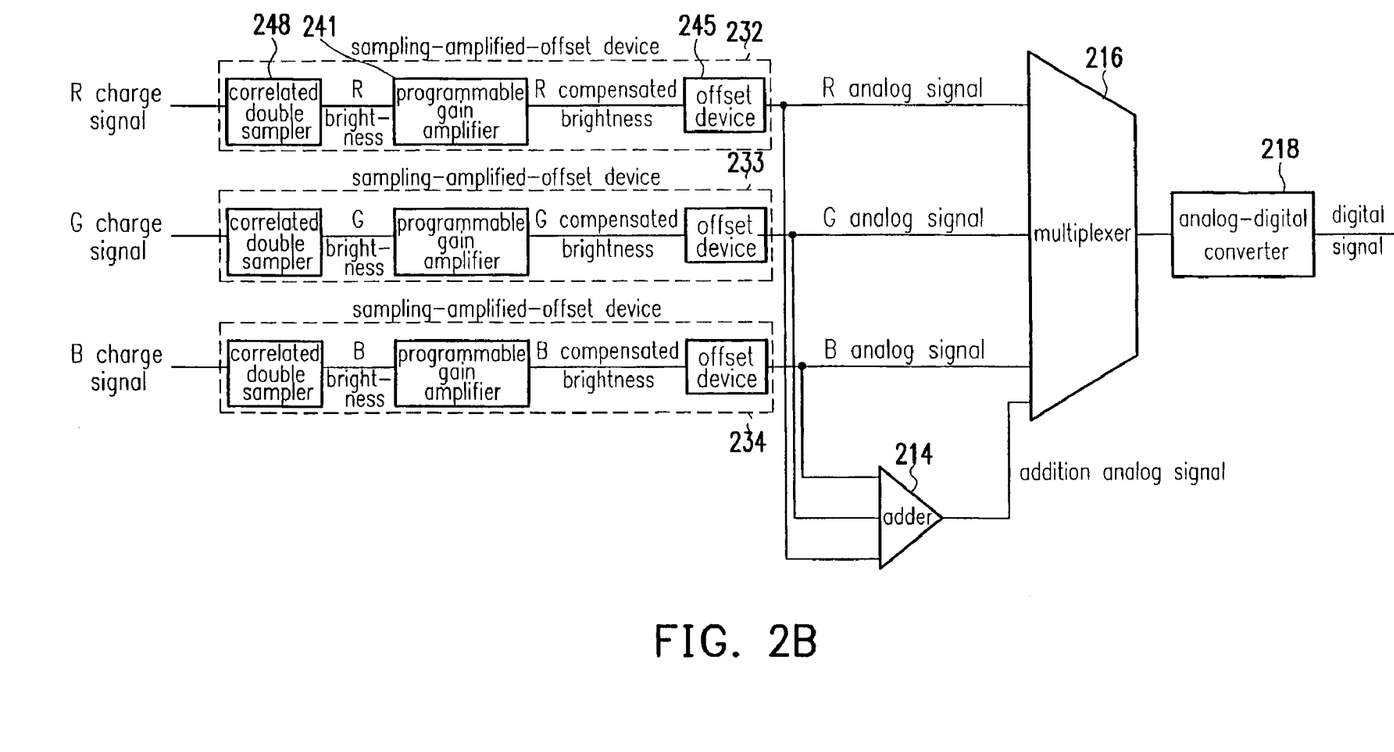

In FIG. 2A, the programmable gain amplifier and offset device (such as the programmable gain amplifier 210 and the sampling-amplified-offset devices 202, 204, 206) can be interchanged. As shown in FIG. 2B, the correlation double sampler 248 of the sampling-amplified-offset device 232 samples the R charge signal twice. A subtraction operation is performed on the sampled results to obtain an R brightness. The offset device 241 compensates the level of the R brightness to obtain an R-compensated brightness. The programmable gain amplifier 245 can adjusts a gain value. The R-compensated brightness output from the offset device 241 is amplified with the gain to obtain an R analog signal. The sampling-amplified-offset devices 233, 234 are similar to the sampling-amplified-offset device 232. The positions of the offset device and the programmable gain amplifier in the following sampling-amplified-offset device are interchangeable.

Figure 3A:
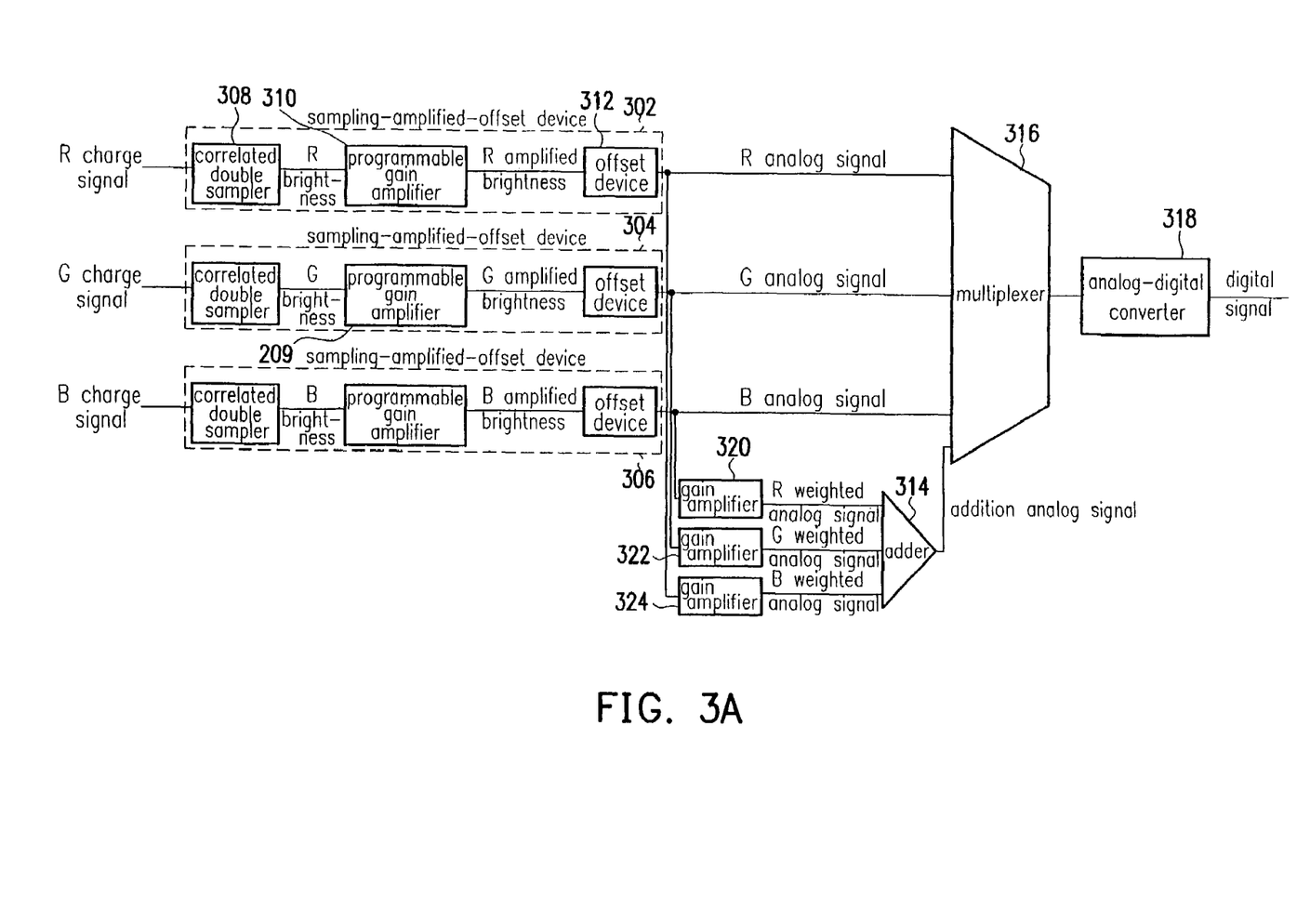
FIGS. 3A and 3B shows another embodiment of the signal processing circuit of a scanner converting the RGB into gray scale and yuv color model.

Referring to FIG. 3A, another embodiment of a signal processing circuit in a scanner to convert RGB into gray scale and yuv color model is illustrated. In FIG. 3A, the R charge signal, the G charge signal and the B charge signal detected by the sensor (not shown) are sent to the sampling-amplified-offset devices 302, 304, 306, respectively. The sampling-amplified-offset devices 302, 304, 306 sample, amplify and compensate levels of the R, G and B charge signals to obtain an R analog signal, a G analog signal and a B analog signal.

Meanwhile, the gain amplifier 320 multiplies the R analog signal by a first weighted value to obtain and output an R-weighted analog signal to the adder 314. The gain amplifier 322 multiplies the G analog signal by a second weighted value to obtain and output a G-weighted analog signal to the adder 314. The gain amplifier 324 multiplies the B analog signal by a third weighted value to obtain and output a B-weighted analog signal to the adder 314.

The adder 314 performs an addition calculation the R-weighted analog signal, the G-weighted analog signal and the B-weighted analog signal output from the gain amplifiers 320, 322 and 324 to obtain an addition analog signal. The multiplexer 316 can then select the R analog signal, the G analog signal, the B analog signal or the addition analog signal to output to the analog-digital converter 318, which then converts the selected signal into a digital signal.

In FIG. 3A, the sampling-amplified-offset devices 320, 304 and 306 may also comprise a plurality of devices. For example, the sampling-amplified-offset device 302 includes a correlation double sampler 308, a programmable gain amplifier 310 and an offset device 312. The correlation double sampler 308 performs sampling twice on the R charge signal to obtain two sampling results, which are then subtracted from each other to obtain an R luminance. The programmable gain amplifier 310 can adjust gain (of which the adjustable range is determined according tot eh bit length for storing gain value). According to the gain, the R luminance output from the correlation double sampler 308 is amplified to obtain an R-amplified luminance. The offset device 312 compensates the level of the R-amplified luminance to obtain the R analog signal. The sampling-amplified-offset devices 304 and 306 have structures similar to that of the sampling-amplified-offset devices 302 and function similarly.

When the scanner is performing a gray scale scan, the R analog signal, the G analog signal, and the B analog signal are adjusted with different weighted values to obtain the R-weighted analog signal, the G-weighted analog signal and the B-weighted analog signal. The R, G and B-weighted analog signals are then added by the adder 314 to obtain an addition analog signal. The multiplexer 316 then selects the R, G B-weighted analog or the addition analog signal and outputs the selected one to the analog-digital converter 318 and the subsequent circuit. According to the luminance of the weight adjusted addition analog signal, the analog-digital converter 318 and the subsequent circuit may reflects the gray scale response of the scanner more precisely.

The conversion between the RGB color model and the yuv color model can be performed using the circuit as shown in FIG. 3A. According to the above matrix state, the luminance y and the RGB signal are correlated as:

$y=0.299R+0.587G+0.114B$

Thus, the gain amplifier 320 in FIG. 3A has a first weighted value of 0.299. The gain amplifier 322 has a second weighted value of 0.587, and the gain amplifier 324 has a third weighted value of 0.114.

Figure 3B:
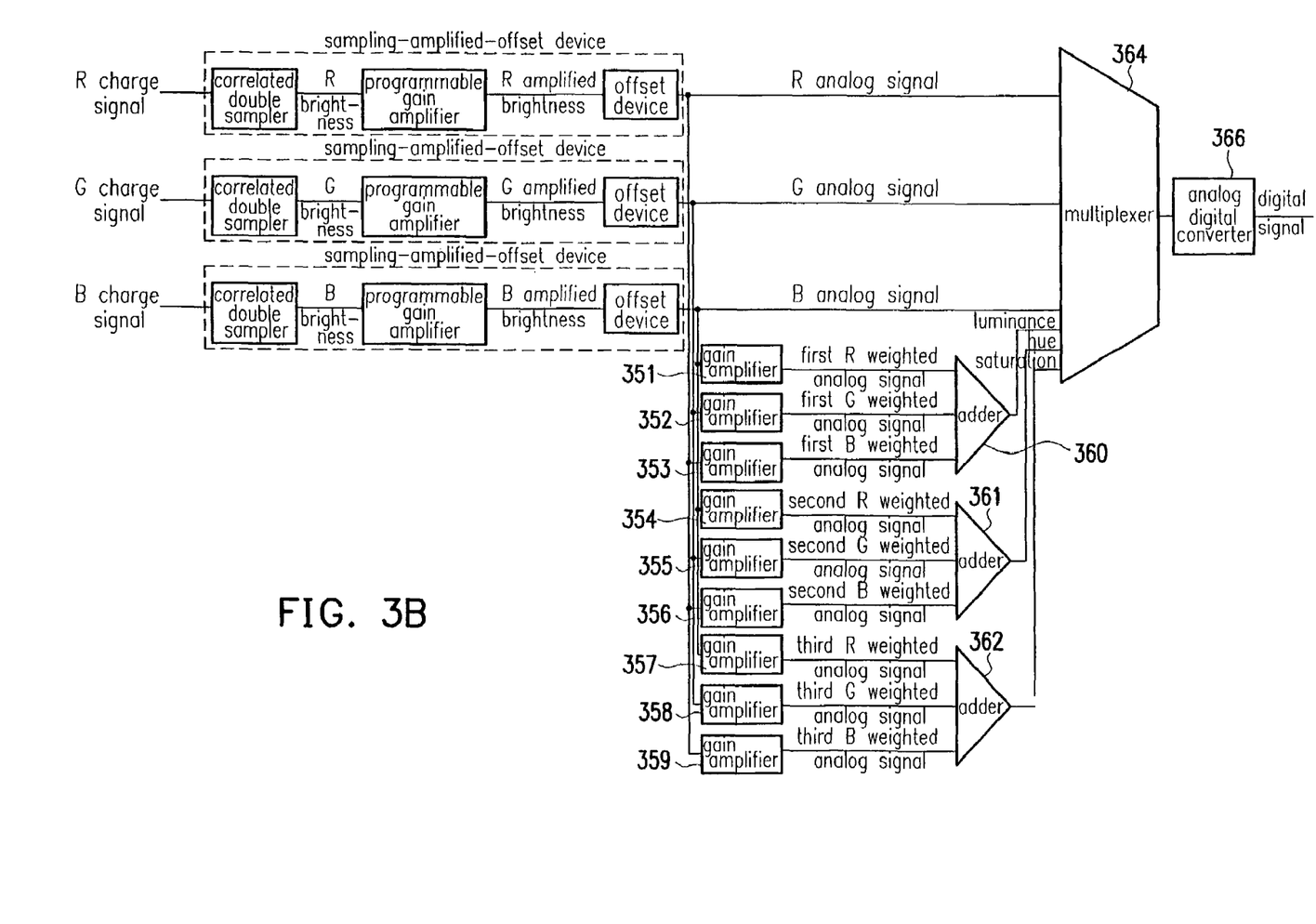

If the above RGB color model is converted into a yuv color model, and the luminance y, hue u and saturation v in the yuv color model are required, the circuit in FIG. 3A has to be modified as the circuit in FIG. 3B.

In FIG. 3B, the gain amplifier 351 multiplies the R analog signal with a first weighted value to obtain and output a first R-weighted analog signal to the adder 360. The gain amplifier 352 multiplies the G analog signal by a second weighted value to obtain and output a first G-weighted analog signal to the adder 360. The gain amplifier 353 multiplies the B analog signal by a third weighted value to obtain and output a first B-weighted analog signal to the adder 360. The gain amplifier 354 multiplies the R analog signal by a fourth weighted value to obtain and output a second R-weighted analog signal to the adder 361. The gain amplifier 355 multiplies the G analog signal with a fifth weighted value to obtain and output a second G-weighted analog signal to the adder 361. The gain amplifier 356 multiplies the B analog signal by a sixth weighted value to obtain and output a second B-weighted analog signal to the adder 361. The gain amplifier 357 multiplies the R analog signal by a seventh weighted value to obtain and output a third R-weighted analog signal to the adder 362. The gain amplifier 358 multiplies the G analog signal by an eighth weighted value to obtain and output a third G-weighted analog signal to the adder 362. The gain amplifier 359 multiplies the B analog signal by a ninth weighted value to obtain and output a third B-weighted analog signal to the adder 362.

The adder 360 performs an addition calculation on the first R-weighted analog signal, the first G-weighted analog signal and the first B-weighted analog signal to obtain the luminance y. The adder 361 performs an addition calculation on the second R-weighted analog signal, the second G-weighted analog signal and the second B-weighted analog signal to obtain the hue u. The adder 362 performs an addition calculation on the third R-weighted analog signal, the third G-weighted analog signal and the third B-weighted analog signal to obtain the saturation v. The multiplexer 364 may select the R analog signal, the G analog signal, the B analog signal, the luminance y, the hue u or the saturation v. The selected one is then output to an analog-digital converter for conversion into a digital signal.

According to the matrix for converting RGB color model to yuv color model, the relationship between the luminance y, hue u and saturation v can be expressed as:

$$y=0.299R+0.587G+0.114B$$

$$u=0.596R-0.275G-0.321B$$

$$v=0.212R-0.523G+0.113B$$

Therefore, in FIG. 3B, the first weighted value in the gain amplifier 351 is 0.299, the second weighted value of the gain amplifier 352 is 0.587, and the third weighted value of the gain amplifier 353 is 0.114. The fourth weighted value in the gain amplifier 354 is 0.596, the fifth weighted value of the gain amplifier 355 is −0.275, and the sixth weighted value of the gain amplifier 356 is −0.321. The seventh weighted value in the gain amplifier 357 is 0.212, the eighth weighted value of the gain amplifier 358 is −0.523, and the ninth weighted value of the gain amplifier 359 is 0.311.

In comparison to using software, using the hardware, especially a circuit (such as the gain amplifier and adder) to perform the conversion from RGB color model into yuv color model consumes much less time. The scanner can therefore be operated with a much higher scanning speed.

Thus, the invention is advantageous to reflect precisely the gray scale response for each pixel while the scanner is performing a gray scale scan.

Another advantage of the invention includes using hardware to convert the RGB color model into a different color model to replace the software conversion. Therefore, the time consumption is greatly reduced.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A scanner, comprising:
  a plurality of sampling-amplified-offset devices configured to sample, amplify, and compensate levels of an R charge signal, a G charge signal, and a B charge signal, respectively, to obtain an R analog signal, a G analog signal, and a B analog signal according to the sampling, amplifying, and compensating;
  a gain adder configured to multiply the R, G, and B analog signals by corresponding weighted values and to add the R, G, and B weighted analog signals to obtain a summed analog signal; and
  a multiplexer configured to select at least one of the R analog signal, the G analog signal, the B analog signal, or the summed analog signal as an output signal;
  wherein at least one of the sampling-amplified-offset devices includes:
    a sampler configured to obtain a plurality of samples on at least one of the R, G, or B charge signals and to determine a luminance based, at least in part, on a difference between at least two of the samples;
    a programmable gain amplifier configured to obtain an amplified luminance according to a gain value; and
    an offset device configured to compensate the R, G, or B analog signal of the at least one of the R, G, and B charge signals, respectively, based, at least in part, on the obtained amplified luminance.

2. The scanner of claim 1, wherein the gain adder includes:
  a plurality of gain amplifiers configured to multiply the R, G, and B analog signals by the corresponding weighted values to obtain the R, G, and B weighted analog signals; and
  an adder configured to add the R, G, and B weighted analog signals to obtain the summed analog signal.

3. The scanner of claim 1, wherein the multiplexer is configured to output the selected signal to an analog-digital converter.

4. A scanner, comprising:
  a light sensor configured to obtain scan data including a plurality of analog color signals representing first color parameters of a color model native to the scanner;
  a plurality of gain amplifiers each configured to adjust a corresponding one of the analog color signals by a set gain value, wherein the gain values are set according to a relationship between the first color parameters of the native color model and second different color parameters of a conversion color model to be utilized by subsequent processing of the scan data; and
  an analog-to-digital converter to convert at least one of the adjusted analog signals into a digital signal, wherein the digital signal represents at least one of the second color parameters.

5. The scanner of claim 4, wherein the native color model is an RGB color model and the conversion color model is a YUV color model.

6. The scanner of claim 5, wherein the set gain value used to adjust the R signal is 0.299, the set gain value used to adjust the G signal is 0.587, and the set gain value used to adjust the B signal is 0.114.

7. The scanner of claim 4, further comprising:
a multiplexer configured to receive the adjusted analog color signals that represent the second color parameters of the conversion color model; and
signal lines configured to pass the analog color signals that represent the first color parameters of the native color model to the multiplexer, wherein the passed color signals circumvent the plurality of gain amplifiers;
wherein the multiplexer is configured to select between the passed and adjusted analog color signals to control whether a representation of the scan data output from the scanner conforms to the native color model or the conversion color model.

8. The scanner of claim 4, further comprising a correlation double sampler configured to obtain a plurality of samples of a charge signal and to determine a luminance based, at least in part, on a difference between at least two of the samples.

9. The scanner of claim 8, further comprising a programmable gain amplifier configured to amplify an analog signal representing the determined luminance.

10. The scanner of claim 9, further comprising an offset device configured to compensate the amplified luminance signal.

11. The scanner of claim 9, further comprising an adder configured to perform an addition calculation on the adjusted analog signals.

12. An apparatus, comprising:
means for obtaining scan data including a plurality of analog color signals representing first color parameters of a color model native to the scanner;
means for adjusting each of the analog color signals by a set gain value, wherein the gain values are set according to a relationship between the first color parameters of the native color model and second different color parameters of a conversion color model to be utilized by subsequent processing of the scan data; and
means for converting at least one of the adjusted analog signals into a digital signal, wherein the digital signal represents at least one of the second color parameters.

13. The apparatus of claim 12, wherein the obtaining means comprises a Charge Coupled Device (CCD).

14. The apparatus of claim 12, further comprising means for performing an addition operation on at least a portion of the adjusted analog signals.

15. The apparatus of claim 12, further comprising means for controlling which one of the adjusted analog signals is passed to the converting means.

16. A scanner, comprising:
a plurality of sampling-amplified-offset devices configured to sample, amplify, and/or compensate levels of an R charge signal, a G charge signal, and a B charge signal, respectively, to obtain an R analog signal, a G analog signal, and a B analog signal;
a gain adder configured to multiply the R, G, and B analog signals by corresponding weighted values and to add the R, G, and B analog signals, multiplied by the weighted values, to obtain a summed analog signal; and
output circuitry configured to pass the summed analog signal as an output signal, wherein the output signal corresponds to a different color model than the charge signals.

17. The scanner of claim 16, wherein the sampling-amplified-offset devices comprise a programmable gain amplifier configured to obtain an amplified luminance according to a gain value.

18. The scanner of claim 17, wherein the sampling-amplified-offset devices further comprise a sampler configured to obtain a plurality of samples of the R, G, or B charge signal and to determine a luminance based, at least in part, on a difference between corresponding ones of the samples.

19. The scanner of claim 17, wherein the sampling-amplified-offset devices further comprise an offset device configured to compensate the R, G, or B analog signal of the R, G, and B charge signals, respectively, based, at least in part, on the obtained amplified luminance.

20. The scanner of claim 19, wherein the sampling-amplified-offset devices further comprise a sampler configured to obtain a plurality of samples of the R, G, or B charge signal and to determine a luminance based, at least in part, on a difference between corresponding ones of the samples.

* * * * *

UNITED STATES PATENT AND TRADEMARK OFFICE
CERTIFICATE OF CORRECTION

| | | |
|---|---|---|
| PATENT NO. | : 7,688,487 B2 | Page 1 of 1 |
| APPLICATION NO. | : 11/498416 | |
| DATED | : March 30, 2010 | |
| INVENTOR(S) | : Chen et al. | |

It is certified that error appears in the above-identified patent and that said Letters Patent is hereby corrected as shown below:

On the Title Page:
At Item (54), please replace the title "CIRCUIT SCANNER TO PERFORM COLOR SPACE CONVERSION ON RGB SIGNAL" with --CIRCUIT OF SCANNER TO PERFORM COLOR SPACE CONVERSION ON RGB SIGNAL--.

In the Specifications:
At column 1, line 1, please replace "CIRCUIT SCANNER TO PERFORM COLOR SPACE CONVERSION ON RGB SIGNAL" with --CIRCUIT OF SCANNER TO PERFORM COLOR SPACE CONVERSION ON RGB SIGNAL--.

Signed and Sealed this

Nineteenth Day of October, 2010

David J. Kappos
*Director of the United States Patent and Trademark Office*